US011551294B2

(12) United States Patent
Shackleton et al.

(10) Patent No.: US 11,551,294 B2
(45) Date of Patent: *Jan. 10, 2023

(54) SYSTEMS AND METHODS FOR A REFINANCING SAVINGS WIDGET

(71) Applicant: Capital One Services, LLC, McLean, VA (US)

(72) Inventors: Adam Shackleton, Dallas, TX (US); Patrick Eberle, Frisco, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/670,145

(22) Filed: Feb. 11, 2022

(65) Prior Publication Data
US 2022/0164880 A1    May 26, 2022

Related U.S. Application Data

(63) Continuation of application No. 16/536,661, filed on Aug. 9, 2019, now Pat. No. 11,288,737, which is a (Continued)

(51) Int. Cl.
*G06Q 40/02*    (2012.01)
*G06Q 30/02*    (2012.01)

(52) U.S. Cl.
CPC ....... *G06Q 40/025* (2013.01); *G06Q 30/0255* (2013.01)

(58) Field of Classification Search
CPC .......................... G06Q 40/025; G06Q 30/0255
See application file for complete search history.

(56) References Cited

U.S. PATENT DOCUMENTS 8,019,664 B1 * 9/2011 Tifford ................... G06Q 10/10
715/224
10,410,282 B2 * 9/2019 Shackleton .......... G06Q 40/025
(Continued)

FOREIGN PATENT DOCUMENTS

AU        2016202766 A1 *  5/2016  ............. G06Q 30/02
WO   WO-2006127295 A2 * 11/2006  ............. G06Q 40/02

OTHER PUBLICATIONS

McDonald, Daniel J., and Daniel L. Thornton. "A primer on the mortgage market and mortgage finance." Review—Federal Reserve Bank of Saint Louis 90, No. 1 (2008): 31 (Year: 2008).*

(Continued)

*Primary Examiner* — Hani M Kazimi
*Assistant Examiner* — James H Miller
(74) *Attorney, Agent, or Firm* — Perkins Coie LLP

(57) ABSTRACT

Systems and methods are provided for calculating a savings amount for loan refinancing. According to one implementation, a method includes displaying a graphic user interface comprising a widget at a client device and receiving input data from a user regarding a loan. In some embodiments, the input data may include the user's credit level and the current monthly payment, APR, and payoff amount associated with the user's current loan. The method further includes determining a saving amount based on a comparison of the input data with historical savings data accessible to the widget, and displaying the savings amount in the graphic user interface.

20 Claims, 6 Drawing Sheets

Related U.S. Application Data continuation of application No. 14/474,648, filed on Sep. 2, 2014, now Pat. No. 10,410,282.

(60) Provisional application No. 61/876,960, filed on Sep. 12, 2013.

(56) References Cited

U.S. PATENT DOCUMENTS

| | | | |
|---|---|---|---|
| 11,288,737 B2 * | 3/2022 | Shackleton | G06Q 40/025 |
| 2004/0073508 A1 * | 4/2004 | Foster | G06Q 40/00 705/38 |
| 2005/0004860 A1 * | 1/2005 | Pretell | G06Q 40/02 705/38 |
| 2008/0005016 A1 * | 1/2008 | Uhlmann | G06Q 40/025 705/38 |
| 2011/0213641 A1 * | 9/2011 | Metzger, II | G06Q 20/102 705/7.34 |
| 2014/0344018 A1 * | 11/2014 | Thalken | G06Q 40/025 705/7.31 |

OTHER PUBLICATIONS

Method, Apparatus and Article to Automatically Calculate Periodic Payment Information (U.S. Appl. No. 09/584,611, filed May 31, 2000) (Year: 2000).*

* cited by examiner

FIG. 5

REFINANCE YOUR LOAN
APPLYING IS FAST, FREE, AND MAY SAVE YOU MONEY

Current Monthly Payment [Select ▽]
Credit Level [Select ▽]
Current APR [Select ▽]
Current Payoff [Select ▽]

[CALCULATE SAVINGS]

REFINANCE CUSTOMERS SAVE
on Average*

$500/YEAR

TRY IT YOURSELF
See how much you could save

[APPLY NOW]

*These savings and payments are estimated and based on actual customers similar to the inputs provided. Actual offer is dependent on full credit application.

**REFINANCE YOUR LOAN
APPLYING IS FAST, FREE, AND MAY SAVE YOU MONEY**

| | |
|---|---|
| Current Monthly Payment | $300 - $400 ▾ |
| Credit Level | Excellent ▾ |
| Current APR | 3 – 5% ▾ |
| Current Payoff | $10k - $15K ▾ |

[CALCULATE SAVINGS]

CUSTOMERS WITH SIMILAR INFORMATION SAVE ON AVERAGE*

$479/YEAR

That's a savings of $40/month.

[APPLY NOW]

*These savings and payments are estimated and based on actual customers similar to the inputs provided. Actual offer is dependent on full credit application.

FIG. 6

| | POOR | FAIR | GOOD | EXCELLENT | |
|---|---|---|---|---|---|
| $ 0-5,000 | N.D. | $30 | $40 | N.D. | 0-3% |
| | N.D. | N.D. | $20 | $27 | 3.01-5% |
| | N.D. | N.D. | N.D. | N.D. | 5.01-8% |
| $ 5,001-10,000 | N.D. | $45 | $22 | N.D. | 0-3% |
| | $51 | $57 | $60 | $54 | 3.01-5% |
| | N.D. | N.D. | $62 | N.D. | 5.01-8% |
| $ 10,001-15,000 | N.D. | N.D. | N.D. | N.D. | 0-3% |
| | N.D. | N.D. | N.D. | N.D. | 3.01-5% |
| | N.D. | N.D. | N.D. | N.D. | 5.01-8% |

FIG. 7

SYSTEMS AND METHODS FOR A REFINANCING SAVINGS WIDGET

CROSS-REFERENCE TO RELATED APPLICATIONS

This application is a continuation of U.S. patent application Ser. No. 16/536,661, filed Aug. 9, 2019, which is a continuation of U.S. patent application Ser. No. 14/474,648, filed Sep. 2, 2014, which claims the benefit of priority under 35 U.S.C. § 119 to U.S. Provisional Application No. 61/876,960, filed on Sep. 12, 2013, each of which applications is expressly incorporated herein by reference in its entirety.

TECHNICAL FIELD

The present disclosure relates generally to systems and methods for advertising. More particularly, and without limitation, the disclosure relates to systems and methods for advertising refinancing options based on user input.

BACKGROUND INFORMATION

As greater numbers of people use the World Wide Web for communication, commerce, and other daily activities, they generate larger and larger volumes of traffic over the Internet. Because the benefits of commercializing the Internet can be tremendous, businesses increasingly take advantage of this traffic by advertising their products or services online. These advertisements may appear in the form of leased advertising space (e.g., "banners") on content websites, pop-ups, etc. One aspect of advertising is targeted advertising towards specific customers. For example, customers accessing websites related to home buying may be provided advertising related to refinancing options for various loans related home buying. Each time one of the advertisements is shown to a viewer of the website is known as an "impression." When shown the advertisement, the user may select, or "click," on the advertisement or take another "action" indicating a response to the advertisement. If the user later refinances a loan, the refinancing is referred to as a "conversion" of the impression. Advertisers may pay owners of content Web sites (i.e., the publishers) based on, for example, the number of impressions, clicks, or conversions made through advertisements on the content Web sites over the course of an advertising campaign.

Presently, online advertising associated with refinancing is often presented via banner ads that provide a savings claim that customers can save a certain average amount per year. There is large variance, however, in how much distinct customers may save per year. Accordingly, because the savings claim is not accurate for many of the potential applicants, prospective applicants may have a perception that the savings claim is always inaccurate, discouraging additional customers from applying for refinancing based the advertisement.

The present disclosure is directed to improved systems and methods for advertising refinancing options. Moreover, the present disclosure is directed to improved techniques for providing more detailed refinancing information, while solving one or more of the above-mentioned challenges.

SUMMARY

Embodiments of the present disclosure provide systems and methods for advertising. Embodiments of the present disclosure may be implemented using computer systems and methods, such as those disclosed herein.

One aspect of the disclosure is directed to a method that includes displaying a graphic user interface at a client device and receiving input data from a user regarding a current loan, the input data including, for example, current monthly payment, credit level, current APR, and current payoff amount. The method further includes determining a potential saving amount from refinancing the loan based on a comparison of the input data with a historical savings data associated with the would-be provider of the refinancing loan, and displaying the savings amount in the graphic user interface.

Another aspect of the disclosure is directed to a system that includes an input device for receiving input from a user, a display device for displaying a graphical user interface, and a processor. The system may be configured to display the graphic user interface, receive input data from the user regarding a current loan, the input data including current monthly payment, credit level, current APR, and current payoff amount. The processor may be further configured to determine a saving amount based on a comparison of the input data with a historical savings data associated with the would-be provider of the refinancing loan, and display the savings amount in the graphic user interface.

Yet another aspect of the disclosure is directed to a computer-readable storage medium storing a program which, when executed by a computer, causes the computer to perform operations comprising displaying a graphic user interface at a client device, and receiving input data from a user regarding a current loan, the input data including current monthly payment, credit level, current APR, and current payoff amount. The operations may further include determining a saving amount based on a comparison of the input data with a historical savings data associated with the would-be provider of the refinancing loan, and displaying the savings amount in the graphic user interface.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 5 is a representation of an exemplary graphical user interface, consistent with the disclosed embodiments; and FIG. 6 is another representation of an exemplary graphical user interface, consistent with the disclosed embodiments.

FIG. 7 is an exemplary historical savings table, consistent with the disclosed embodiments.

DESCRIPTION OF THE EMBODIMENTS

Reference will now be made in detail to exemplary embodiments of the disclosure, examples of which are illustrated in the accompanying drawings. Wherever convenient, the same reference numbers will be used throughout the drawings to refer to the same or like parts.

Figure 1:
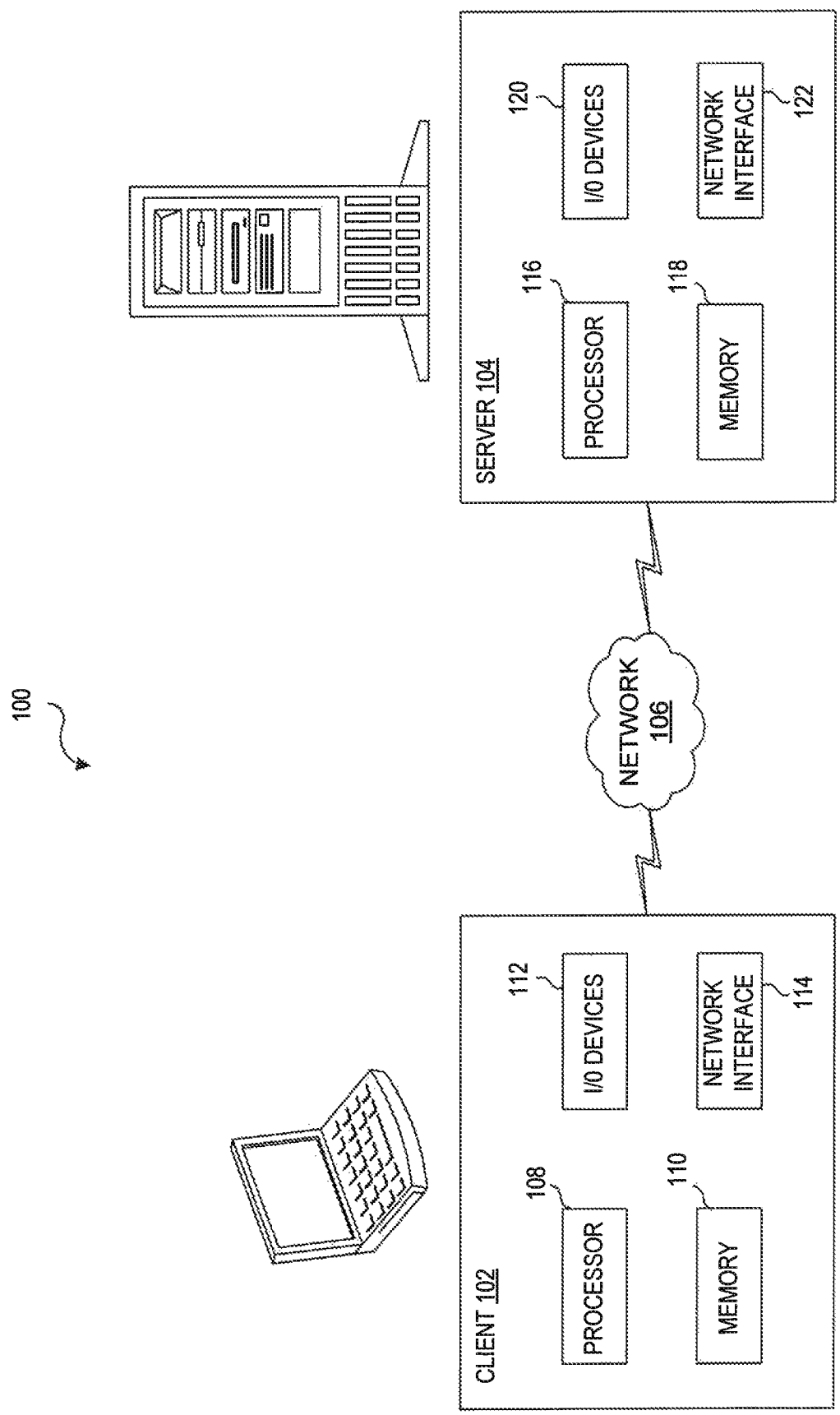
FIG. 1 depicts a block diagram of an exemplary environment in which embodiments consistent with the present disclosure may be practiced and implemented.

FIG. 1 is a representation of an exemplary system 100, consistent with the disclosed embodiments. System 100 may include a client 102 and a server 104 connected via a network 106. By way of non-limiting example, client 102 may comprise a personal computer, a hand-held computer such as a tablet, a personal digital assistant, a portable navigation device, a mobile phone, and/or another computing device known in the art. Client 102 may include a processor 108, a memory 110, one or more input/output devices 112, and a network interface 114 for communicating on network 106.

Processor 108 may comprise one or more processors (e.g., a CPU) configured to execute instructions and to process data to perform one or more functions associated with system 100. Processor 108 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in client 102. Processor 108 may be configured to execute instructions to perform the disclosed processes.

Memory 110 may comprise one or more memory devices that store data, such as, for example, random access memory (RAM), read-only memory (ROM), a magnetic storage device (e.g., a hard disk), an optical storage device (e.g., a CD- or DVD-ROM), an electronic storage device (e.g., EPROM or a flash drive), and/or another other data storage devices known in the art. Memory 110 may store one or more applications for performing the disclosed processes, which may be executed by processor 108. The applications may be implemented using applets, plug-ins, modules, and/or any other software components known in the art.

Input/output devices 112 may include one or more components allowing a user of system 100 to interface with client 102. For example, input/output devices 112 may include user input devices such as a keyboard, a keypad, a mouse, a touch pad, a touch screen, a microphone, an accelerometer, and/or any other user input device known in the art. Input/output devices 112 may also include output devices such as a display (e.g., an LCD, a CRT display, or a plasma display), a printer, a speaker, and/or any other output device known in the art.

Network interface 114 may comprise any communication device for sending and receiving data. In some aspects, network interface 114 may include one or more digital and/or analog communication devices that allow client 102 to communicate with other machines and devices, such as other components of system 100. For example, network interface 114 may include a modem, a transceiver a network communication card, a satellite dish, an antenna, or another network adapter capable of transmitting and receiving data over network 106.

Server 104 may comprise a personal computer, a mainframe computer, and/or any other server computing device known in the art. Similar to client 102, server 104 may include a processor 116, a memory 118, input/output devices 120, and/or a network interface 122 for communicating on network 106. The components of server 104 may be the same or similar to those discussed above in connection with client 102 and, accordingly, discussion thereof is omitted. Server 104 may respond to request from client 102 received from network 106 in connection with the disclosed processes. It is noted that server 104 may comprise a single server computer or a collection of server computers. For example, server 104 may be part of a distributed server network (not shown) and may distribute data for parallel processing to one or more additional servers on the distributed server network.

Figure 2:
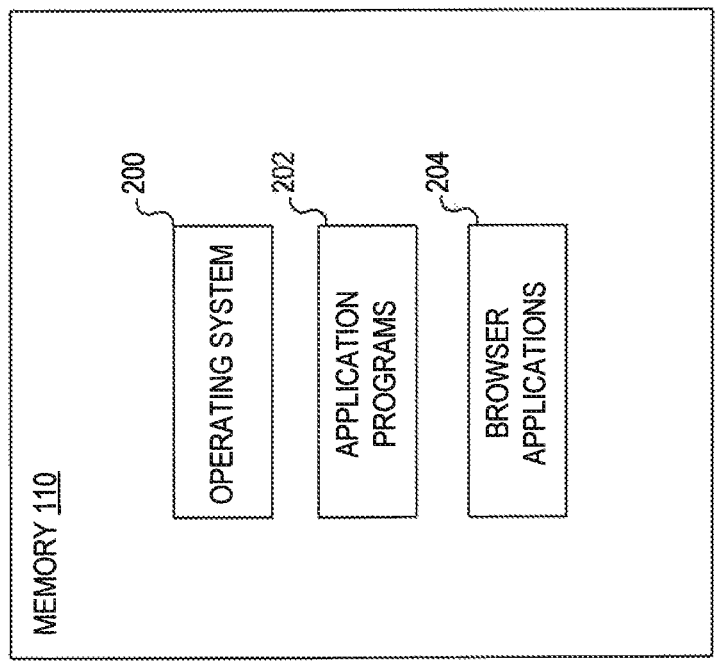
FIG. 2 is a representation of the components and information that may be stored in a memory of a client associated with the system of FIG. 1, consistent with the disclosed embodiments.

FIG. 2 is a representation of the components and information that may be stored in client memory 110 in further detail, consistent with the disclosed embodiments. As shown, memory 110 may store an operating system 274, such as DOS, Windows, or Linux. Memory 110 may also include one or more application programs 202, such as word processing, database programs, spreadsheet programs, presentation programs, and graphics programs, and/or other programs capable of generating documents or other electronic content. Memory 110 may also include browser applications 204 capable of rendering standard Internet content, such as Google Chrome, Microsoft Internet Explorer, and/or Mozilla Firefox. The disclosed embodiments are not limited to separate programs or computers configured to perform dedicated tasks. For example, memory 110 may include a single program that performs the functions of the client 102, or memory 110 may comprise multiple programs. Additionally, processor 108 may execute one or more programs located remotely from client 102. Memory 110 may store data reflecting any type of information in any format that the system may use to perform operations consistent with the disclosed embodiments. Processor 108 may leverage and execute operating system 200, application programs 202, and/or browser applications 204 in connection with the disclosed processes.

Figure 3:
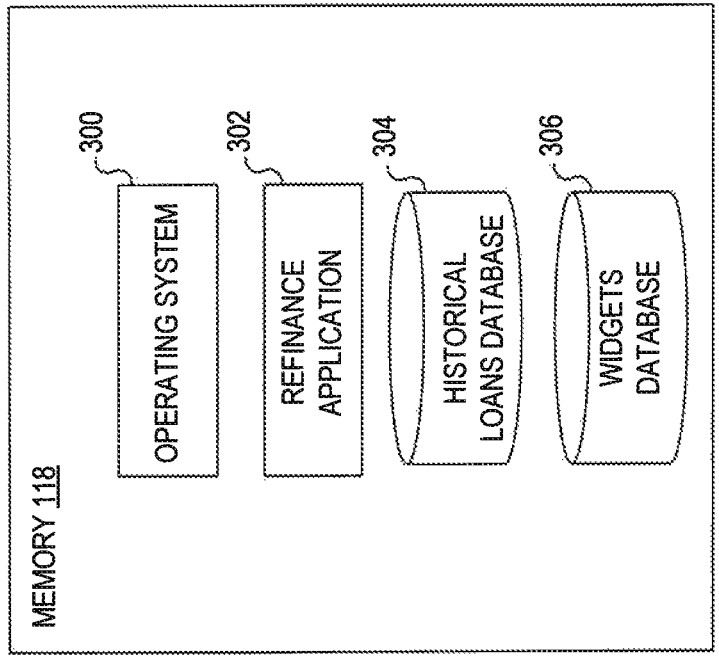
FIG. 3 is a representation of the components and information that may be stored in a memory of a server associated with the system of FIG. 1, consistent with the disclosed embodiments.

FIG. 3 is a representation of the components and information that may be stored in server memory 118 in further detail, consistent with the disclosed embodiments. As shown, memory 118 may include an operating system 300, a refinance application 302, historical loans database 304, and a widget database 306.

Refinance application 302 may comprise one or more loan saving calculation applications configured to calculate loan saving data that may be included within widgets provided to client device 102 based on actual customers. For this calculation, data related to actual customers who have refinanced their loans may be stored in historical loans database 304. For example, the data may be based on all conversions from online advertisements or generally based on general refinancing data at a financial institution. Data related to characteristics of each refinanced loan may be stored in the historical loans database including monthly payments before the refinancing, credit level of the person acquiring the loan, APR before refinancing, and payoff amount when the refinancing occurred. Refinance application 202 may utilize the data stored in historical loans database 304 to generate a historical savings data table for each possible combination of loan characteristics. The table may be organized based on preset or user selected parameters and ranges. Additionally, the ideal parameters and ranges may be determined based on algorithmic analysis of stored data.

Accordingly, as an example, based on the data stored in the historical loans database 304, it may be calculated that the average savings amount per month is $10 for a potential loan customer where the person acquiring the loan had a pre-refinancing monthly payment of between $20-$30, his/her credit level was excellent, the pre-refinancing APR was between eight percent and ten percent, and the balance was between $500-$1000. Accordingly, a historical savings data table may be generated based on these four characteristics that indicate the average savings amount for each potential combination of these loan characteristics. If there is no data or no historical savings for a particular combination, then that may also be stored in the generated table. The generated table may be stored in the widget database 306 as historical savings data.

Databases 304 and 306 may include one or more memory devices that store information and are accessed and/or managed through server 104. By way of example, databases 304 and 306 may include Oracle™ databases, Sybase™ databases, or other relational databases or non-relational databases, such as Hadoop sequence files, HBase, or Cassandra. Systems and methods of disclosed embodiments, however, are not limited to separate databases. In one aspect, server 104 may include databases 304 and 306. Alternatively, databases 304 and 306 may be located remotely from the server 104. Databases 304 and 306 may include computing components (e.g., database management system, database server, etc.) configured to receive and process requests for data stored in memory devices of databases 304 and 306 and to provide data from database 304 and 306. According to some embodiments, the historical savings data table stored in widget database 306 is included within the widget provided to client device 102. Accordingly, as explained in further detail later with respect to step 406 of exemplary method 400, a determination may be made regarding a saving amount based on comparison of data inputted by a user and the historical savings data.

Figure 4:
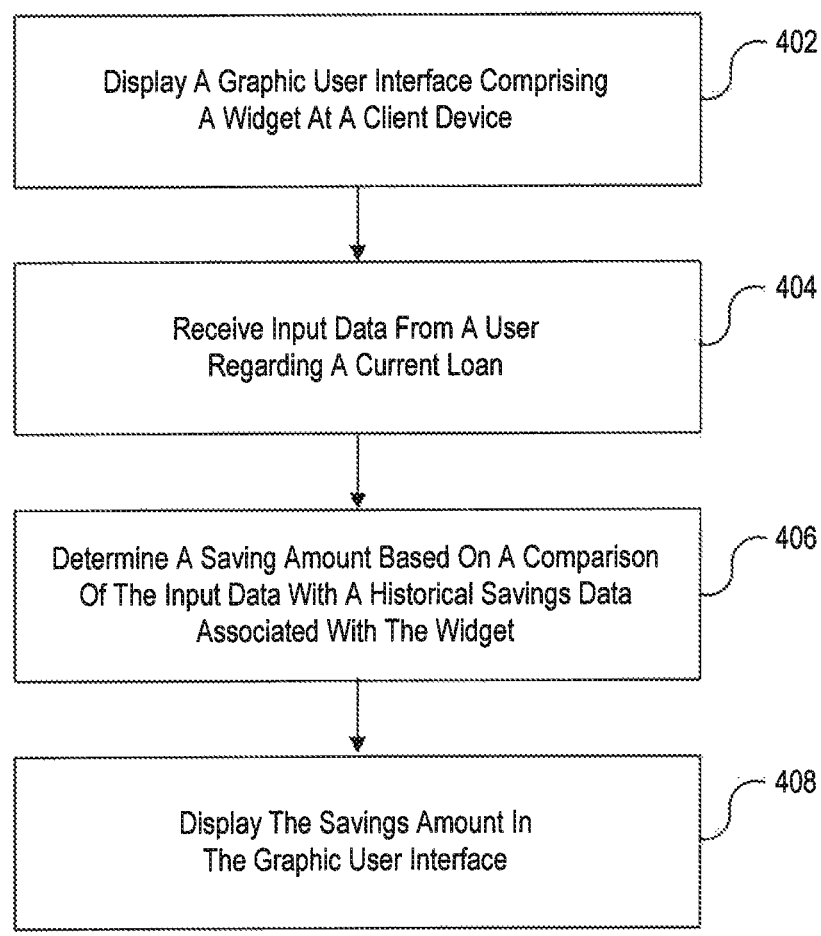
FIG. 4 is a flowchart depicting an exemplary method for determining a refinancing savings amount, consistent with the disclosed embodiments.

FIG. 4 is a flowchart depicting an exemplary method 400 for displaying a refinance savings widget, consistent with the disclosed embodiments. Method 400 may be performed based on, for example, program modules stored in client memory 110. Method 400 may be performed primarily by client 102, though it may be performed in combination with, for example, server 104. Specifically, method 400 may be performed to display a graphical user interface in client 102.

At step 402, client 102 may display a graphic user interface comprising a widget. For example, client 102 may access a website associated with server 104 when a user enters a domain name or uniform resource locator (URL) into a Web browser application associated with client 102. Alternatively, a pop-up advertisement may be displayed on client 102 as is known in the art. FIG. 5 is a representation of an exemplary graphical user interface 500, consistent with the disclosed embodiments. The graphical user interface 500 comprising a widget may contain a plurality of sections. For example, graphical user interface 500 may comprise a saving claims section 502 and loan information section 504. Saving claims section 502 may display a pre-calculated average savings for the public at large as an advertisement encouraging users (i.e., users operating client 102) to interact with graphical user interface 500 to estimate savings for a loan specific to those users. For example, section 502 may display an exemplary savings amount of $500. Loan information section 504 may include user input section 506 containing four input boxes dealing with characteristics related to a user's outstanding loans. These four boxes allow a user to input information (via, e.g., client 102) related to the user and any outstanding loans. In this exemplary graphical user interface 500, loan information section 504 may deal with refinancing of a vehicle. Accordingly, client 102 may display graphical user interface 500 to a user allowing the user to provide input regarding different characteristics. The characteristics may include, for example, the user's current monthly payment, credit level, annual percentage rate (APR), payoff amount, and/or any other information influence loan terms. According to some embodiments, graphical user interface 500 may allow the user to input the information on client 102 utilizing drop down boxes.

At step 404, client device 104 may receive input data from a user regarding a current loan. The input data may include current monthly payment, credit level, current APR, current payoff amount, and/or any other information influence loan terms. As depicted in FIG. 5, the user may input (using, e.g., client 102) data utilizing the drop down menus of user input section 506, where a user provided various preset ranges to select for each of the current monthly payment, the credit level, the current APR, and the current payoff amount. In other embodiments, the user may input data via graphical user interface 500 via checkboxes, text entry, or any other suitable means of inputting characteristics.

Continuing the above example, the current monthly payment, current APR, and the current payoff amount boxes may provide selectable options based on preset numerical ranges. The credit level box, for example, may include selectable options including Poor, Fair, Good, and Excellent. Additionally, corresponding ranges of credit scores may be provided along with the credit level options or instead of the credit level options. According to some embodiments, this information is self-reported and is not verified. In other embodiments, client 102 may receive or otherwise access information from a financial service provider associated with the user's loan to allow verification of the user's input. In either situation, client 102 may compare the combination of user inputs with the stored table to identify the saving amount corresponding to the inputted user characteristics.

In additional embodiments, the widget may be configured to receive data related to a user from server 104. The data related to the user may include credit history, information related to existing loans, or shopping habits. Access to this data may be provided based on explicit authorization or based on a partnership agreement with financial organizations. For example, if a user logs into a financial institution's website, information related to loans of the user held by that financial institution and its partners may be provided by pre-populating the fields. Additionally, a user authenticating themselves on any websites with partnerships may allow access to a potential applicant's credit information or loan history for efficient pre-population of data in the widget.

In embodiments, if the user changes the pre-populated fields or enters information inconsistent with data related to a user that is saved in server 104, an indication may be provided to a user that inaccurate results could result from this inconsistency.

At step 406, client device 102 may determine a saving amount based on a comparison of the input data with a historical savings data associated with the widget. As discussed above, the historical savings data is a table that may be generated and saved initially in server 104. Thereafter, as part of the widget or along with the widget, the historical savings data may be transferred to client device 102. In other embodiments, client 102 may access the historical saving data stored in server 104 (e.g., history loans database 304) when determining the savings amount. Accordingly, the combination of user inputs is compared with the stored table that is the historical savings data to determine the saving amount corresponding to the inputted user characteristics.

For accuracy in this determination, the historical savings data may be organized so as to cover all possible ranges and selections available to a user for input in the graphical user interface 500. In other embodiments, the users may be pre-screen by the financial service provider (or partners thereof) offering refinancing through the widget, and the estimated savings amount may be based on pre-authorized terms for the user.

The historical savings data table may be populated based on time-based criteria or numeric criteria, i.e., based on data over a minimal period of time or a certain amount of data being available for a combination of characteristics over any period of time. Alternatively, the table may be populated based on a combination of the two. For example, data from a threshold amount of loan data over a threshold period of time may lead to the population of the historical savings data. In some embodiments, for example, certain historical savings data may be generated if there is data related to ten instances of a combination of particular characteristics over five years. Additionally or alternatively, if within any one year period there are more than five instances of a combination of particular characteristics, the historical savings data for that combination may be populated as indicated in FIG. 7, discussed below.

FIG. 7 illustrates an exemplary historical savings data table. One of ordinary skill in the art would comprehend that this table is provided for exemplary purposes only, and the organization is not limited to the illustrated order. In this exemplary table 700, only three characteristics are illustrated for ease of discussion. Specifically, historical savings table 700 chart illustrates a populated chart for the combination of current payoff balance on existing loans, credit score, and current APR. Various ranges of current payoff are represented by column 702. Various types of credit scores are represented by row 704. Various ranges of current APRs are represented by column 706. For each of the ranges of current payoff amounts, corresponding APR ranges are provided. For example, in table 700, lines 708, 710, and 712 are provided. These APR ranges are repeated for each of the ranges of current payoffs. Similarly, if a current monthly payment ranges were included, they would be included for each of opposing characteristic. For example, the multiple ranges of current monthly payment ranges would be included for each of the credit levels.

For combinations of characteristics that do not have enough instances to populate table 700, an indication may be included that not enough data is available utilizing. In this example, a designation of "N.D." is used. Alternatively, for combinations of characteristics that have enough instances to populate data, an indication of the dollar amount for the average savings may be provided.

In some embodiments, historical data may be stored as combination of various additional metrics by which data may be collected or analyzed. The various metrics may include remaining term on loans, make or model of vehicle to refinance, original term of the loan, original balance of the loans, outstanding balances relative to the value of the underlying asset, or other relevant metrics in the field of finance. As one of ordinary skill in the art would comprehend, any additional metrics than the four listed above in the explanation related to FIGS. 4 and 5 would have corresponding input boxes in user input section 506. Alternatively, any of the four boxes dealing with characteristics related to a loan may be replaced by alternative characteristics including remaining term on loans, make or model of vehicle to refinance, original term of the loan, original balance of the loans, outstanding balances relative to the value of the underlying asset, or other relevant metrics in the field of finance. Corresponding information to any additional characteristics would then also be saved as historical savings data.

At step 408, display the savings amount in the graphic user interface. As depicted in FIG. 6, the user may input (via, e.g., the graphical user interface 500 displayed on client 102) a $300-400 current monthly payment for the user's current loan at 3-5% APR, an excellent credit score, and $10,000-$15,000 left on the original loan amount. According to this example, client 102 may determine that a person having $300-400 current monthly payment, 3-5% APR, an excellent credit score, and $10,000-$15,000 left on the original loan amount typically saves $479 per year by refinancing the loan.

In additional embodiments, the table may indicate that there is no savings for a particular set of characteristics. Alternatively, no data related to real customers may exist for certain combination of characteristics related to loans. Therefore, responsive to a determination that there is no savings amount based on the comparison of the input data with the historical savings data or a there is no historical savings data corresponding to the combinations of characteristics that are inputted by a user, information related to such a determination may be displayed on the graphical user interface. For example, graphical user interface 500 may indicate that "at this time, there are no savings for similar loans" or "at this time, there is no data related to loans with similar characteristics."

One skilled in the art will appreciate that computer programs for implementing the disclosure may be stored on and/or read from computer-readable storage media. The computer-readable storage media may have stored thereon computer-executable instructions which, when executed by a computer, cause the computer to perform, among other things, the processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art.

One skilled in the art will further realize that the processes illustrated in this description may be implemented in a variety of ways and may include multiple other modules, programs, applications, scripts, processes, threads, or code sections that may all functionally interrelate to accomplish the individual tasks described above. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed for this purpose. In addition, the disclosure may be implemented in a variety of different data communication network environments and may use software, hardware, or a combination of hardware and software to provide the disclosed functions.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims. For example, the steps of the disclosed methods can be modified in any manner, including by reordering steps or inserting or deleting steps.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. It is intended that the specification and examples be considered as exemplary only, with a true scope and spirit of the invention being indicated by the following claims.

What is claimed is:

1. A method comprising:
   providing, to a client device, financial characteristics data of a current loan of a user;
   authenticating the client device with a server to allow access to loan information of the user;
   receiving a historical savings data table comprising savings amounts of a plurality of potential loan characteristic combinations generated based on historical savings data of a plurality of consumers;
   comparing the financial characteristics data with the historical savings data of the plurality of consumers reflecting a corresponding savings amount for each of the plurality of potential loan characteristic combinations;
   determining a savings amount based on a comparison of a plurality of possible combinations of loan characteristics derived from the financial characteristics data against the plurality of potential loan characteristic combinations; and
   causing the client device to display, on a graphical user interface the savings amount and at least a portion of the financial characteristics data of the current loan of the user.

2. The method of claim 1, further comprising:
   providing an advertisement to the client device indicating the savings amount; and
   displaying the graphical user interface in response to a user interaction with the advertisement.

3. The method of claim 1, wherein the historical savings data further comprises loan data associated with customers of a financial service provider offering loan refinancing through the graphical user interface.

4. The method of claim 1, wherein the historical savings data further comprises loan data associated with customers of at least one financial service provider not offering loan refinancing through the graphical user interface.

5. The method of claim 1, wherein the graphical user interface comprises a saving claims section and a loan information section.

6. The method of claim 5, wherein the saving claims section displays a pre calculated average savings.

7. The method of claim 5, wherein the loan information section displays a user input section.

8. The method of claim 7, wherein the user input section comprises input boxes for characteristics related to outstanding loans.

9. A system comprising:
   a memory storing instructions; and
   one or more processors configured to execute the instructions to perform operations comprising:
   providing, to a client device, financial characteristics data of a current loan of a user;
   authenticating the client device with a server to allow access to loan information of the user;
   receiving a historical savings data table comprising savings amounts of a plurality of potential loan characteristic combinations generated based on historical savings data of a plurality of consumers;
   comparing the financial characteristics data with the historical savings data of the plurality of consumers reflecting a corresponding savings amount for each of the plurality of potential loan characteristic combinations;
   determining a savings amount based on a comparison of a plurality of possible combinations of loan characteristics derived from the financial characteristics data against the plurality of potential loan characteristic combinations; and
   causing the client device to display, at a graphical user interface, the savings amount and at least a portion of the financial characteristics data of the current loan of the user.

10. The system of claim 9, wherein the instructions further cause the one or more processors to perform operations comprising:
    providing an advertisement to the client device indicating the savings amount; and
    displaying the graphical user interface in response to a user interaction with the advertisement.

11. The system of claim 9, wherein the historical savings data further comprises loan data associated with customers of a financial service provider offering loan refinancing through the graphical user interface.

12. The system of claim 9, wherein the historical savings data further comprises loan data associated with customers of at least one financial service provider not offering loan refinancing through the graphical user interface.

13. The system of claim 9, wherein the graphical user interface comprises a saving claims section and a loan information section.

14. The system of claim 13, wherein the saving claims section displays a pre calculated average savings.

15. The system of claim 13, wherein the loan information section displays a user input section.

16. The system of claim 15, wherein the user input section comprises input boxes for characteristics related to outstanding loans.

17. A computer-readable storage medium storing instructions that, when executed by one or more processors, causes the one or more processors to perform operations comprising:
    providing, to a client device, financial characteristics data of a current loan of a user;
    authenticating the client device with a server to allow access to loan information of the user;
    receiving a historical savings data table comprising savings amounts of a plurality of potential loan characteristic combinations generated based on historical savings data of a plurality of consumers;
    comparing the financial characteristics data with the historical savings data of the plurality of consumers reflecting a corresponding savings amount for each of the plurality of potential loan characteristic combinations;
    determining a savings amount based on a comparison of a plurality of possible combinations of loan characteristics derived from the financial characteristics data against the plurality of potential loan characteristic combinations; and causing the client device to display, at a graphical user interface, the savings amount and at least a portion of the financial characteristics data of the current loan of the user.

18. The computer-readable storage medium of claim 17, wherein the instructions further cause the one or more processors to perform operations comprising:
providing an advertisement to the client device indicating the savings amount; and
displaying the graphical user interface in response to a user interaction with the advertisement.

19. The computer-readable storage medium of claim 17, wherein the historical savings data further comprises loan data associated with customers of a financial service provider offering loan refinancing through the graphical user interface.

20. The computer-readable storage medium of claim 17, wherein the historical savings data further comprises loan data associated with customers of at least one financial service provider not offering loan refinancing through the graphical user interface.

* * * * *